United States Patent [19]

Sheehan

[11] Patent Number: 5,132,493

[45] Date of Patent: Jul. 21, 1992

[54] DEVICE FOR CONNECTING NON-METALLIC SHEATHED CABLE TO AN ELECTRIC BOX

[76] Inventor: Robert K. Sheehan, 571 Rolling Rock La., Cincinnati, Ohio 45255

[21] Appl. No.: 647,518

[22] Filed: Jan. 25, 1991

[51] Int. Cl.$^5$ .............................................. H02G 3/06
[52] U.S. Cl. .................... 174/65 R; 285/162; H02G/3/06
[58] Field of Search .............. 174/65 R, 151, 152 R, 174/153 R; 285/161, 162; 248/56

[56] References Cited

U.S. PATENT DOCUMENTS

| | | | |
|---|---|---|---|
| 1,106,761 | 8/1914 | Weikert et al. | 285/162 |
| 1,787,774 | 1/1931 | Briegel | 285/162 |
| 2,490,286 | 12/1949 | Tornblom | 285/159 |
| 2,508,476 | 5/1950 | Stecher | 285/162 |
| 2,577,748 | 12/1951 | Gillespie | 285/162 |
| 2,744,769 | 5/1956 | Roeder et al. | 285/158 |
| 2,945,085 | 7/1960 | Billups | 174/153 G |
| 2,973,212 | 2/1961 | Rose | 285/159 |
| 3,174,776 | 3/1965 | Berger | 285/162 |
| 3,285,551 | 11/1966 | Tschanz | 248/56 |
| 3,409,858 | 11/1968 | Krehbeil | 439/354 |
| 3,493,205 | 2/1970 | Bromberg | 248/56 |
| 3,746,373 | 7/1973 | Prudente | 285/162 |
| 3,788,582 | 1/1974 | Swanquist | 248/56 |
| 3,989,343 | 11/1976 | Lucius et al. | 439/557 |
| 4,056,252 | 11/1977 | Simon | 248/56 |
| 4,157,799 | 6/1979 | Simon | 248/56 |
| 4,235,502 | 11/1980 | Mars et al. | 439/557 |
| 4,248,459 | 2/1981 | Pate et al. | 285/161 |
| 4,366,344 | 12/1982 | Sheehan | 174/65 R |
| 4,541,036 | 9/1985 | Landries et al. | 361/426 |
| 4,591,658 | 5/1986 | Bauer et al. | 174/65 R |
| 4,619,332 | 10/1986 | Sheehan | 174/65 R |
| 4,687,276 | 8/1987 | Stockmaster | 439/357 |

Primary Examiner—Leo P. Picard
Assistant Examiner—David A. Tone
Attorney, Agent, or Firm—Frost & Jacobs

[57] ABSTRACT

There is provided a connector for connecting non-metallic sheathed cable to an electrical box, with such connector including a substantially tubular body defining an axially extending passageway for receiving one or more cables to be connected. The tubular body has a proximal edge and a distal edge. The connector further includes a first end adjacent the distal edge of the tubular body for insertion into an opening in the electricl box, with the first end having an outwardly extending abutment rib circumscribing at least a portion of the exterior periphery of that end and spaced from the distal edge. The first end further includes at least one releasable locking device having an actuator tab to provide for release of the first end from the opening as desired. A second end of the connector is provided adjacent the proximal edge includes at least one adjustable clamping member which operates independently of the locking device, and which is adapted to substantially immovably clamp the cable within the connector. In a preferred embodiment, the connector of the present invention includes a pair of oppositely disposed locking devices, and a pair of opposed adjustable clamping members. The adjustable clamping members may be provided as wedge-shaped levers which are selectively extending into the connector to bind the cable as a result of rotation of a locking collar threadedly telescoped over the second end of the connector.

20 Claims, 3 Drawing Sheets

DEVICE FOR CONNECTING NON-METALLIC SHEATHED CABLE TO AN ELECTRIC BOX

TECHNICAL FIELD

This invention relates to a device for connecting flexible members such as non-metallic sheathed cable to an electrical box, and, more particularly, to an improved connector featuring a releasable looking device member for attaching the connector to an electrical box and an adjustable clamping member for securing the cable within the connector.

BACKGROUND ART

A wide variety of devices have been utilized over the years to connect flexible electrical conduit and cable to electrical boxes such as outlets, junction boxes, and the like. Two such connectors contemplated for use with non-metallic sheathed for flexible cable include those illustrated and described in U.S. Pat. Nos. 2,577,748 (which issued to D. Gillespie) and 2,744,769 (which issued to W. Roeder et al.). The electrical connector of the Gillespie patent is held in the junction box by a flange and a plurality of outwardly extending lugs. The body portion of this connector has a curved finger which extends inwardly and includes a plurality of teeth. The cable is passed through the connector in order to spring the finger and increase its angle of repose. The cable is gripped between the curved end of the finger and the opposed surface of the connector, and the opposed teeth of the finger and the connector serve to grip the cable therewithin.

The Roeder et al. bushing includes an annular shoulder 14 which engages plate of the electrical box to limit the projection of the connector through a hole formed in the box. A separate ring-like fastener having a plurality of resilient lugs 17 is held within a channel formed about the periphery of the connector, and these lugs are pushed inwardly into the channel as the connector is pushed into the hole. Once fitted within the hole, the lugs snap back into their normally extended positions to hold the connector in place. Removal of the Roeder et al. bushing from the electrical box can be achieved by prying the fastener ring out of the channel and removing it from the connector. A flat resilient gripping finger is mounted within the connector to provide a ratchet/pawl arrangement to hold the cable therewithin. As can be understood, these connectors are difficult to remove from the electrical box once in place, and the connector and cable can be disassembled only by the application of substantial and possibly destructive forces.

Other prior electrical connector devices include a split shell arrangement such as shown in U.S. Pat. Nos. 2,490,286 (which issued to N. Tornblom) and 2,945,085 (which issued to J. Billups). For example, the Billups device comprises two shell-like sections which are connected and then rotated to fit within a bulkhead of an electrical box such that its grooves interact with that bulkhead to secure the connector. At the opposite end of the connector, corresponding tabs and tab openings slide together and interlock to retain the rotated shell portions in their connecting positions. The interior of the connector can be formed with ridges in order to hold the enclosed wires in place once the connector is rotated into connected position. Such a multi-piece arrangement is relatively expensive and complicated in manufacture and use, and is not well suited for removal and/or reuse once in place.

Similarly, the Tornblom connector requires a plurality of parts such as a split snap-ring which mounts within a peripheral groove near the forward end of the split shell components. The resilient ring enables the half-shells to be compressed upon insertion of the connector into the opening of an electrical box until the edges of the hole snap into the locking grooves of the connector. Thereafter, the cable clamping screw is tightened forcing the sheet metal U-shaped arm against the cable to clamp it in place and to effectively lock the split shell portions of the connector in locked condition within the hole. Again, this connector requires a multiplicity of parts which complicates manufacture and use, and requires a number of these parts to be metallic in nature. These requirements add to the expense of the connector and detract from the convenience of use.

A number of attempts have been undertaken in the prior art to provide a connecting arrangement which avoids the conventional locknut securement of the connector to the box by providing the connecting or mounting end as an expandable unit utilizing a screw to provide the expanding pressure. One example of such a structure is shown in U.S. Pat. No. 3,174,776, which issued to K. Berger. Particularly, the Berger connector is designed for use with rigid wall conduit (i.e. those having a metallic protective tube), and features an overlapping body arrangement having an opposed pair of insertion limiting shoulders which define a semi-circular groove about the periphery of the connector. The split nature of the connector enables the opposing shoulders to be radially compressible during insertion into the electrical box opening, whereby the groove will spring outwardly upon reaching the opening to temporarily join the connector with the box. A set screw is thereafter tightened onto the electrical conduit, completing the connection between the connector and the conduit by tightening the interaction between the groove and the opening of the electrical box. However, the Berger connector teaches the use of sheet metal as the material for forming the connector, and relies in part upon the rigid nature of the conduit in order to achieve the secure connection between conduit, connector, and electrical box. The use of a set screw is often not feasible when connecting non-metallic sheathed cable, as the set screw could easily penetrate the protective covering and short out the connection.

U.S. Pat. Nos. 4,056,252 and 4,157,799 (which both issued to H. Simon) attempt to address the concerns of utilizing a set screw arrangement with non-metallic cables by providing an intermediate protective member between the pressure exerting screw and the cable. However, these connectors rely upon the set screw to provide both the binding force for securing the connector and the cable, and the radial outward force required to secure the connector to the electrical box.

U.S. Pat. No. 3,788,582, which issued to W. Swanquist, attempts to address the connection of a non-metallic sheathed cable without the use of a set screw. Particularly, the Swanquist connector includes a main bore for accepting the cable to be connected and a cross bore in which is journaled a rotary cam member. When rotated, the cam member works against the enclosed cable to indent the cable into a connector body recess, thereby securing the cable within the connector. This caming action also allegedly works to spread the segmented front portion of the connector so that the grooves of the connector firmly seat against the opening of the electrical box. While this arrangement may eliminate the objections to utilizing a set screw for non-metallic cable, it is a disadvantage to have the same mechanism providing the connection between the cable and the connector and between the connector and the electrical box. Particularly, both connections must be made simultaneously, thereby eliminating some of the flexibility in using these connectors in actual applications. It may be advantageous to complete the connection between the non-metallic cable and the connector prior to making the connection with the electrical box, or visa versa.

U.S. Pat. No. 4,687,276 (which issued to E. Stockmaster) contemplates separate connection of a ribbon cable to a cable connector, and the connection of the connector to an electrical panel. However, the Stockmaster design contemplates the attachment of a separate connector to a clip, which can then be inserted into a rectangular slot in an electrical panel. While details of the Stockmaster connector are not set forth in the patent, it appears that the arrangement requires a connector and a separate clip device, with the connector being somehow attached to the ribbon cable. U.S. Pat. No. 3,285,551 (which issued to A. Tschanz) also discloses a multi-piece connector which provides separate connections for connector/conduit and connector/support structure interfaces. The Tschanz assembly includes a slotted first end for insertion into an aperture, and a slotted, tapered second end which can be engaged onto a conduit by tightening a tapered nut 46 thereover. Once connected to a bulkhead or box, however, there is no provision for removal of the Tschanz connector.

Consequently, while a wide variety of electrical connectors have been attempted and available in the industry, heretofore there has not been available a relatively simple connector for connecting non-metallic sheathed cable to an electrical box which can provide improved flexibility and convenience in accomplishing a secure connection between the cable and an electrical box.

DISCLOSURE OF THE INVENTION

It is an object of this invention to obviate the above-described problems and shortcomings of the connecting devices heretofore available in the industry.

It is another object of the present invention to provide an improved connector for connecting non-metallic sheathed cable to an electrical box.

It is yet another object of the present invention to provide a non-metallic sheathed cable connector which provides a relatively simple structure capable of independently securing non-metallic sheathed cable to the connector and securing the connector to an electrical box.

It is also an object of the present invention to provide a connector which can be easily connected and disconnected for use and reuse as desired.

It is yet another object of the present invention to provide an improved connector for connecting non-metallic sheathed cable to an electrical box which is relatively simple in construction, easy to use, inexpensive and safe.

In accordance with one aspect of the present invention, there is provided a connector for connecting non-metallic sheathed cable to an electrical box, with such connector including a substantially tubular body defining an axially extending passageway for receiving one or more cables to be connected. The tubular body has a proximal edge and a distal edge. The connector further includes a first end adjacent the distal edge of the tubular body for insertion into an opening in the electrical box, with the first end having an outwardly extending abutment rib circumscribing at least a portion of the exterior periphery of that end and being spaced from the distal edge. The first end further includes at least one releasable locking device having an integral actuator tab to provide for release of the first end from the opening as desired. A second end of the connector is provided adjacent the proximal edge and includes at least one adjustable clamping member which operates independently of the locking device, and which is adapted to substantially immovably clamp the cable within the connector.

In a preferred embodiment, the connector of the present invention includes a pair of oppositely disposed locking devices, and a pair of opposed adjustable clamping members. The adjustable clamping members are preferably provided as wedge-shaped levers which are selectively extending into the connector to bind the cable as a result of rotation of a locking collar threadedly telescoped over the second end of the connector.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
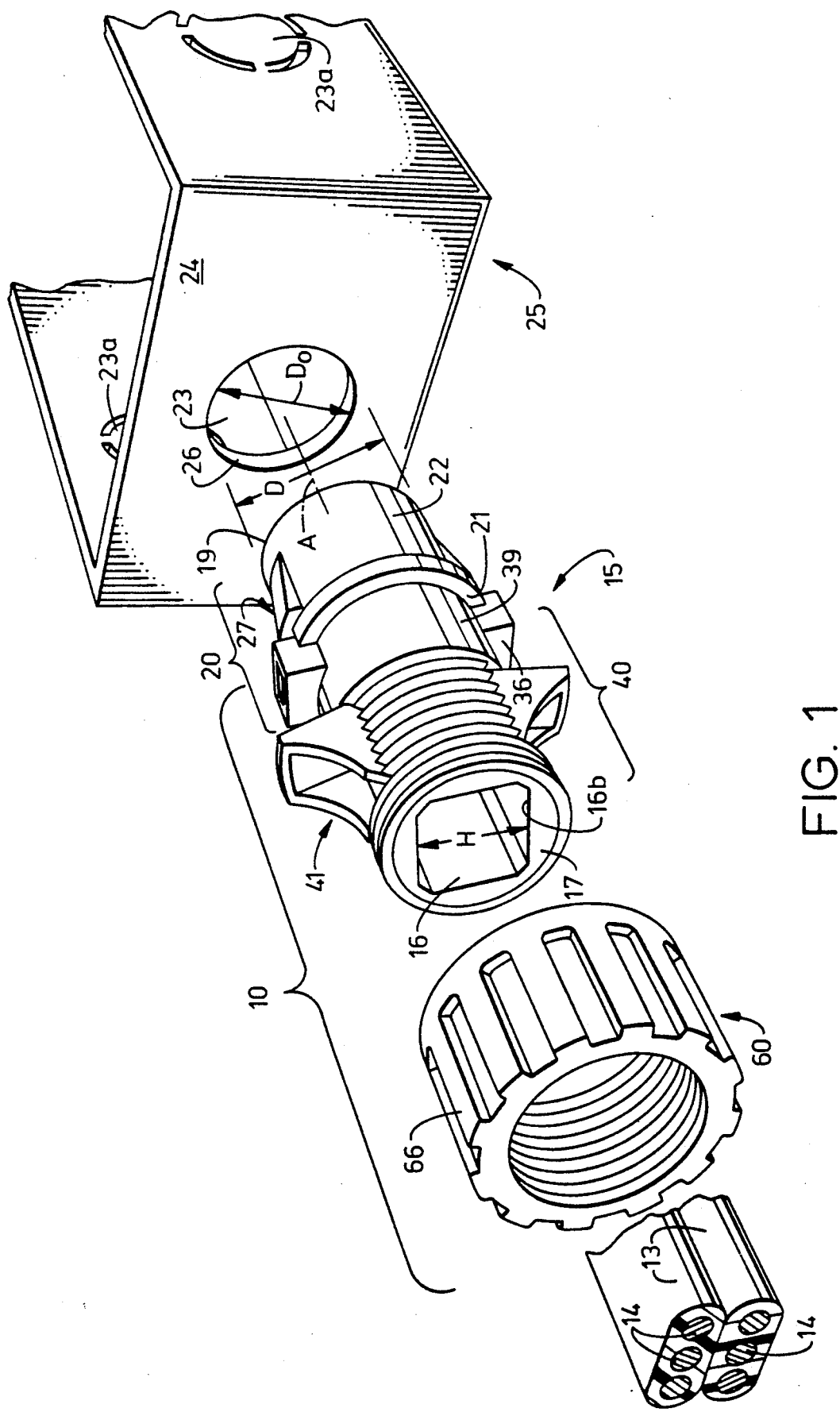
FIG. 1 is an exploded perspective view of a connector made in accordance with the present invention, illustrating an electrical box and portions of cables to be connected thereto.

Referring now to the drawings in detail, wherein like numerals indicate the same elements throughout the views, FIG. 1 illustrates an exploded perspective view of a preferred embodiment of a connector 10 made in accordance with the present invention.

Particularly, FIG. 1 shows an exploded perspective view of connector 10 illustrated in conjunction with an electrical box 25 having an opening 23 into which connector 10 is to be inserted. Non-metallic sheathed cables 13 to be inserted into connector 10 and electrical box 25 are also shown in FIG. 1. Cables 13 may be any kind of flexible cable or chord, generally comprising one or more wires and a non-metallic protective sleeve or sheath.

Figure 4:
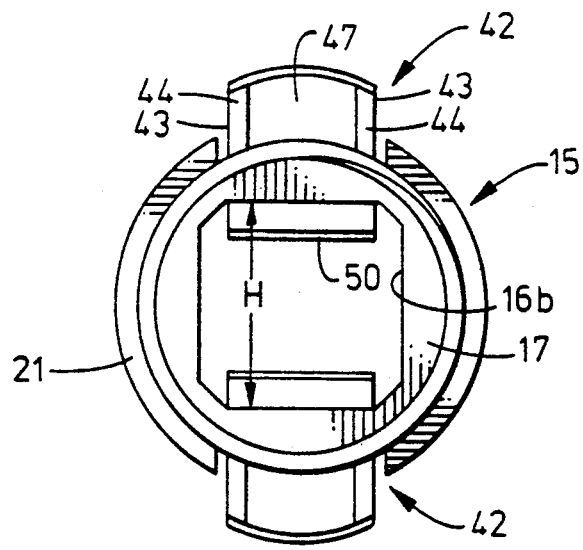
FIG. 4 is a left-end view of the tubular body portion of the connector shown in FIG. 1.
Figure 5:
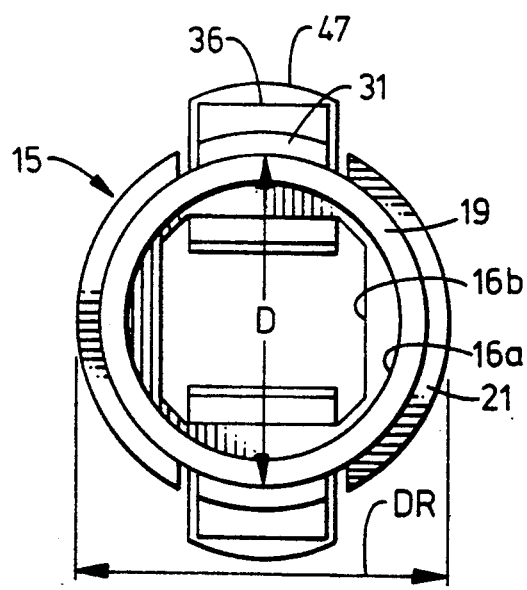
FIG. 5 is a right-end view of the tubular body portion of the connector shown in FIG. 1.

Connector 10 comprises a substantially tubular body 15 which defines an axially extending passageway 16 along central axis A. Tubular body 15 has a proximal edge 17 and a distal edge 19. As best illustrated in FIGS. 1, 4 and 5, axial passageway 16 may preferably include a substantially cylindrical portion 16a adjacent distal edge 19, and a more box-shaped portion 16b adjacent proximal edge 17. Passageway 16 is preferably sized to receive one or more non-metallic sheathed cables 13 to be connected to electrical box 25.

Connector 10 further comprises a first end 20 adjacent distal edge 19 of tubular body 15, designed to facilitate insertion into an opening (e.g. 23) of an electrical box. As illustrated, electrical box 25 may include a plurality of knock-out portions 23a which can be easily removed to provide openings 23 for receiving cable connector devices. Electrical box 25 is illustrated as including an opening 23 having an inside diameter DO of a predetermined standard size in the industry. The outer periphery 22 of first end 20 is preferably formed with an outside diameter D slightly smaller than the diameter DO of opening 23 to enable easy insertion of connector 10 into opening 23.

Figure 2:
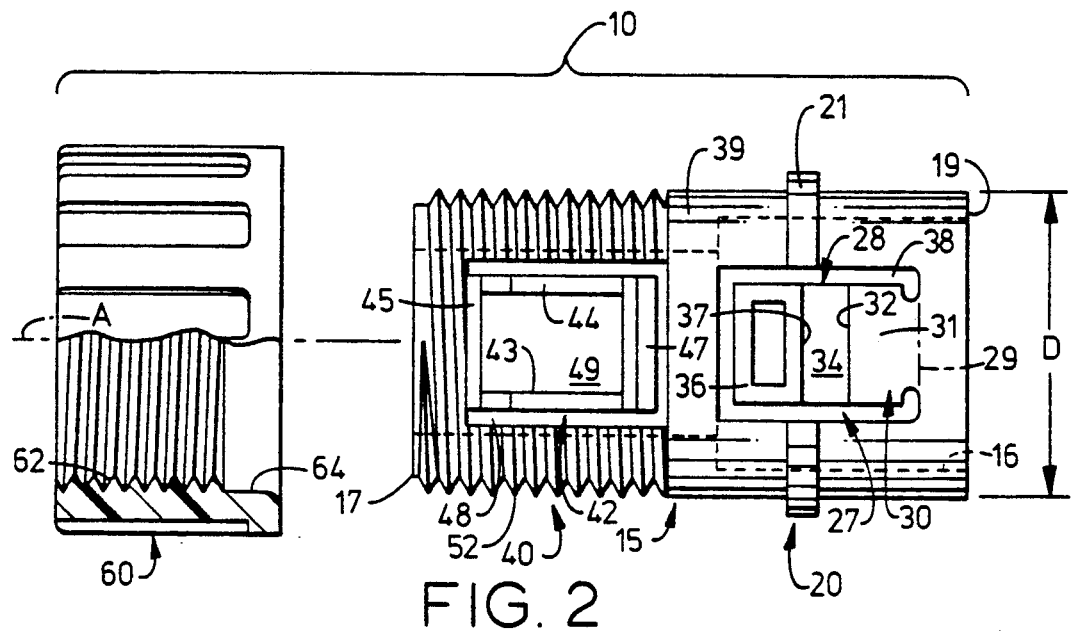
FIG. 2 is a partially broken out, cross-sectional view of the connector shown in FIG. 1.
Figure 3:
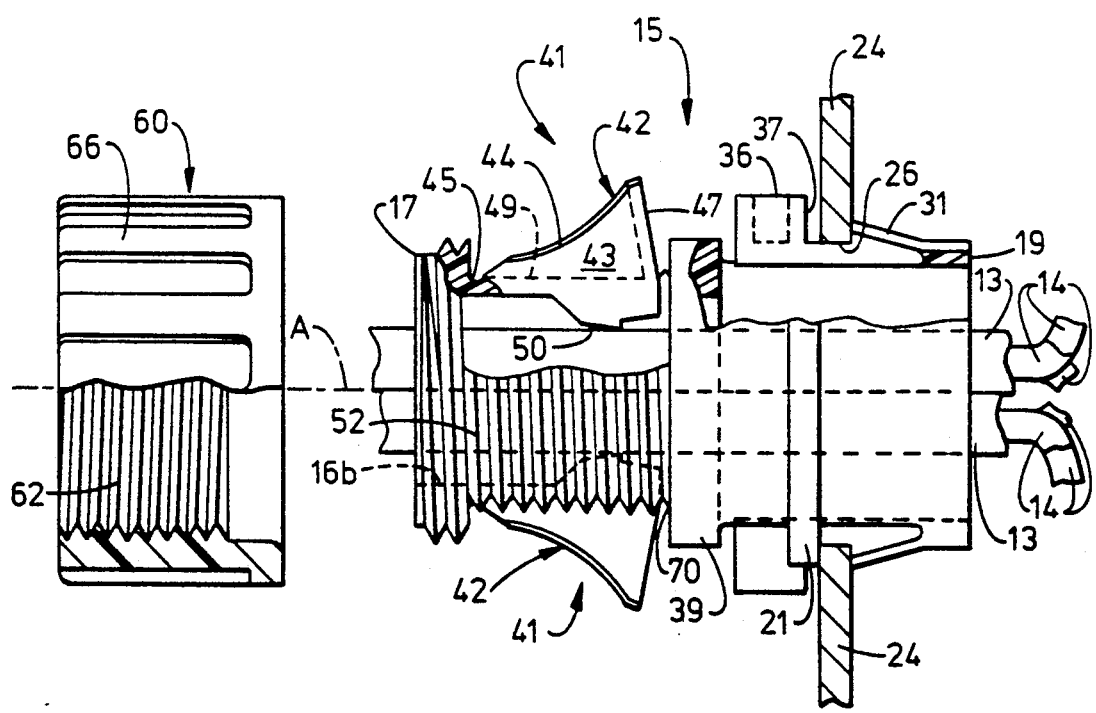
FIG. 3 is a partially broken out, cross-sectional bottom view of the connector of FIG. 21.

Circumscribing at least a portion of outer periphery 22, and preferably spaced somewhat from distal edge 19, is an outwardly extending abutment rib 21 designed to limit the axial insertion of connector 10 into the opening of an electrical box. As best seen in FIGS. 2 and 3, first end 20 further comprises at least one means 27 for releasably locking connector 10 within opening 23 of an electrical box 25. Locking means 27 preferably further comprises a cantilevered member 28 attached to first end 20 adjacent distal edge 19. As will be understood, it is preferred that cantilevered member 28 be attached along its proximal end 29 so as to be normally outwardly biased so that it tends to remain in the position shown in FIGS. 1 and 3.

Cantilevered member 28 is preferably integrally formed with the balance of first end 20 of connector 10, such as by injection molding, welding, or the like. In a preferred embodiment, tubular body 15 may be molded as a unitary structure from high-impact PVC compound, glass reinforced polymers, fiberglass, or the like. Particularly, it is contemplated that tubular body 15 might most preferably be formed as a single, resilient, lightweight piece to minimize costs and manufacturing complexity.

As best illustrated in FIGS. 2 and 3, cantilevered member 28 further comprises a locking tab 30 which includes an inclined portion or ramp 31 and locking shoulder 32, a recess or notch 34 directly adjacent shoulder 32, and an actuator tab 36 having an inner shoulder 37. The U-shaped cutout 38 provides a small space between cantilevered member 28 and the balance of first end 20, thereby permitting the flexure of cantilevered member 28 about its proximal end 29. It is also preferred that a pair of oppositely disposed locking means 27 be provided to ensure adequate securement of connector 10 to an electrical box.

As will be understood, when the distal edge 19 of connector 10 is inserted into an opening 23, the inner edges 26 of opening 23 will first contact the inclined portions 31, flexing the cantilevered members 28 in an inward direction as connector 10 is pushed inwardly into electrical box 25. Cantilevered members 28 will be flexed inwardly until inner edge 26 of opening 23 passes beyond shoulder 32 of locking tab 30. Once inner edge 26 passes shoulder 32, cantilevered members 28 will automatically spring outwardly to return to their initial position. The outwardly biased, flexible nature of cantilevered member 28 thereby causes recesses 34 to be seated against inner edges 26 of opening 23. As illustrated in FIG. 3, the connector 10 will be positively locked in position with wall 24 of electrical box 25 by the seating of recess 34 against the inner edges 26, and wall 24 will be held between shoulder 32 of locking tab 30 and the inner surfaces of abutment rib 21.

Once connector 10 has been snapped into locked connection with electrical box 25, it will remain connected unless intentionally released from such connection. Particularly, release of connector 10 can be accomplished by pressing actuator tabs 36 of cantilevered members 28 in an inward direction to move shoulders 32 out of engagement with the inner surfaces 26 of wall 24. As will be appreciated, it is preferred that actuator tabs 36 extend outwardly away from the central axis A of connector 10 substantially further than the inclined portions 31 of cantilevered members 28 to facilitate user access and release procedures. Actuator tabs 36 should also be of sufficient size and shape to enable convenient access and operation by the user. As also illustrated in FIGS. 1-3, it is also preferred that a spacer 39 be provided behind abutment rib 21 and actuator tabs 36 to enhance the tactile access to actuator tabs 36 in use.

Tubular body 15 further comprises a second end 40 adjacent proximal edge 17, which includes at least one adjustable clamping member 41. Clamping member 41 is adapted to substantially immovably clamp one or more cables 13 within connector 10. As illustrated, it is preferred that clamping member 41 further comprise a substantially wedge-shaped lever 42 which can extend into the interior of Passageway 16 of connector 10 to clamp one or more cables therewithin. As best illustrated in FIG. 2, wedge-shaped lever 42 is preferably provided with a pair of spaced walls 43, top wall 47, and inner wall 49.

Lever 42 is illustrated as being connected adjacent its bottom edge 45 to second end 40 in a cantilevered manner to enable relatively unencumbered movement of lever 42, as will be described. A U-shaped cutout 48 provides clearance about the periphery of lever 42 to facilitate its rotation about bottom edge 45 and into connector 10 as required.

On the inner surface of inner wall 49, there is provided a contact surface 50 designed to contact and bind against cables 13 held within connector 10 when lever 42 is moved inwardly toward central axis A. Contact surface 50 can be provided with surface texture, teeth, or other friction enhancing means to augment the binding ability of lever 42. As seen best in FIG. 3, the outer edges 44 of opposed walls 43 are preferably curved to provided a relatively smooth ramp-like camming surface. It is further preferred that a pair of oppositely disposed adjustable clamping members 41 be provided within second end 40 to provide symmetrical and secure clamping forces sufficient to adequately hold one or more cables 13 within connector 10.

Means for providing inward pressure on adjustable clamping members 41 preferably includes an axially adjustable collar 60 which is substantially tubular in nature and has internal threads 62 corresponding to external threads 52 formed along the outer periphery of second end 40. Adjustable collar 60 is further illustrated as including a non-threaded drive portion 64 formed adjacent its front inner periphery for contacting and interacting with curved cam edges 44 of wedge-shaped lever 42. The exterior surface of adjustable collar 60 is also preferably formed with a plurality of ribs or knurling 66 to facilitate tactile manipulation for adjusting collar 60 as required.

It will be understood that once one or more cables 13 have been placed within connector 10 (either before or after connection of connector 10 to an electrical box), adjustable collar 60 can be tightened onto second end 40, whereby axial rotational movement of collar 60 translates into movement of collar 60 longitudinally along axis A, thereby correspondingly adjusting the clamping force imposed on cables 13 by wedge-shaped levers 42. While a single adjustable clamping member 41 can be sufficient to securely clamp one or more cables 13 within connector 10, it is preferred that a pair of oppositely disposed clamping members 41 be utilized to provide substantially symmetrical inward clamping forces as a result of axial movement of collar 60. Similarly, a plurality of clamping members 41 could also be spaced about the periphery of connector 10. While it is contemplated that alternate clamping arrangements can equally be utilized in place of the wedge-shaped lever-/adjustable collar arrangement shown and described herein, the described arrangement is preferred for simplicity and reliability.

As also illustrated, first end 20 and second end 40 are connected at their contiguous edges along connection 70. This connection can be achieved by any convenient arrangement, and it may be preferred to form the entire tubular body 15 as a single integral unit. While the separate adjustable collar 60 is also required, it should be understood that collar 60 can be initially threadedly mounted on first end 40 without imposing inward movement on clamping members 41, so that connector 10 can be shipped as a single unit to facilitate handling and eliminate pre-use assembly of multiple pieces.

As mentioned above, it may be preferred that a portion of passageway 16 be provided with a box-like or other non-cylindrical conformation. As best illustrated in FIGS. 4 and 5, in a preferred embodiment, at least a portion of passageway 16 adjacent the portion of second end 40 in which adjustable clamping members 41 will contact cables 13 within connector 10 is formed with a box-like conformation as illustrated at 16b. It has been found that a box-like conformation of the passageway 16b is especially applicable for connectors to be utilized for relatively flat cables (such as commonly referred to in the industry as "Romex"), to preliminarily align the cables within connector 10 and to prevent twisting of the cable during and following the application of compressive forces thereon via clamping members 41. Even where non-flat cables or a plurality of individual wires are to be clamped, a non-cylindrical passageway (e.g. 16b) can be advantageous to obviate loosening of the cables or wires within connector 10 by twisting or the like.

As mentioned above, contact surface 50 of adjustable clamping member 41 can be provided with friction means such as teeth, ribs, serrations or the like to enhance the gripping ability of contact surface against one or more cables to be connected by connector 10. It should be noted that FIG. 4 illustrates the contact surfaces 50 of clamping members 41 in a slightly inwardly oriented position within passageway 16b to demonstrate the inward rotative movement of clamping members 41. Normally, contact surfaces 50 would be substantially flush with the corresponding surfaces of passageway 16b to facilitate insertion of one or more cables 13.

Having shown and described the preferred embodiments of the present invention, further adaptions of the connector described herein can be accomplished by appropriate modifications by one of ordinary skill in the art without departing from the scope of the present invention. Several of such potential modifications have been mentioned, and others will be apparent to those skilled in the art. For example, while it is preferred that the tubular body of the present invention be formed as an integral unit from material such as high impact plastic or the like, the connector could also be formed utilizing one or more metallic parts as well. While it is contemplated that the outward bias of the cantilevered locking means of the present invention can be provided by the inherent nature of the plastic material and molding procedures utilized, such bias could also be provided by other arrangements such as spring-like metallic parts. Accordingly, the scope of the present invention should be considered in terms of the following claims and is understood not to be limited to the details of structure and operation shown and described in the specification and drawings.

I claim:

1. A connector for connecting non-metallic sheathed cable to an electrical box, said connector comprising:
   a substantially tubular body defining an axially extending passageway for receiving one or more cables to be connected, said tubular body having proximal and distal edges;
   a first end adjacent the distal edge of said tubular body for insertion into an opening in said electrical box, said first end having an outwardly extending abutment rib circumscribing at least a portion of the exterior periphery thereof and spaced from said distal edge, and at least one means for releasably locking said first end within said opening, said locking means comprising an integral actuator tab to provide for release of the first end from said opening as desired; and
   a second end adjacent said proximal edge and having at least one adjustable clamping member which operates independently of said locking means and is adapted to substantially immovably clamp said cable within said connector.

2. The connector of claim 1, wherein said locking means is formed integrally with said first end.

3. The connector of claim 1, wherein said locking means further comprises a locking tab, a notch for receiving the edge of said opening of said electrical box, and said actuator tab adjacent said notch and opposite said locking tab, whereby said locking means is designed to lockingly engage said opening within said notch.

4. The connector of claim 1, further comprising a pair of locking means.

5. The connector of claim 3, wherein said locking means is hingedly attached to said first end in a cantilevered manner.

6. The connector of claim 1, wherein said clamping member comprises a wedge-shaped lever which can extend into said connector, and an axially adjustable collar, whereby axial movement of said collar adjusts the clamping force imposed by said lever on cable within said connector.

7. The connector of claim 6, wherein said collar comprises internal threads corresponding to external threads on said second end, and wherein axial movement of said collar is accomplished by rotation of said collar relative to said second end.

8. The connector of claim 1, further comprising a pair of levers.

9. The connector of claim 1, wherein said passageway comprises means for initially aligning cable to be connected within said tubular body.

10. The connector of claim 9, wherein said aligning means comprises a box-like conformation of at least a portion of said passageway.

11. A connector for connecting non-metallic sheathed cable through to an opening in an electrical box, said connector comprising:

a substantially tubular body defining an axially extending passageway for receiving one or more cables, said tubular body having proximal and distal edges;

a first end adjacent the distal edge of said tubular body for insertion into an opening in said electrical box, said first end having an outwardly extending abutment rib circumscribing at least a portion of the exterior periphery thereof and spaced from said distal edge, and at least one means for releasably locking said first end within said opening, said locking means further comprising a locking tab, a notch for receiving the edge of said opening of said electrical box, and an actuator tab adjacent said notch to provide for release of the first end from said opening as desired; and a second end adjacent said proximal edge and having at least one adjustable clamping member which operates independently of said locking means and is adapted to substantially immovably clamp said cable within said connector, said clamping member comprising a wedge-shaped lever which can extend into said connector, and an axially adjustable collar, whereby axial movement of said collar adjusts the clamping force imposed by said lever on cable within said connector.

12. The connector of claim 11, further comprising a pair of locking means.

13. The connector of claim 11, further comprising a pair of clamping members.

14. The connector of claim 11, wherein said collar comprises internal threads corresponding to external threads on said second end, and wherein axial movement of said collar is accomplished by rotation of said collar relative to said second end.

15. The connector of claim 11, further comprising a pair of oppositely disposed locking means and a pair of oppositely disposed clamping members.

16. The connector of claim 11, wherein said locking means are attached to said first end adjacent said distal edge in a cantilevered manner, and are normally outwardly biased to engage said opening and lock said connector therewithin.

17. The connector of claim 16, wherein said actuator tab is located adjacent the distal end of said cantilevered locking means, whereby inward pressure on said actuator tab can overcome the normal outward bias of said locking means for release of said connector from said opening.

18. The connector of claim 11, wherein said wedge-shaped lever further comprises a contact surface which can be extended into said passageway to clamp said cable therewithin.

19. A connector for connecting non-metallic sheathed cable through an opening in an electrical box, said connector comprising:

a substantially tubular body defining an axially extending passageway for receiving one or more cables, said tubular body having proximal and distal edges;

a first end adjacent the distal edge of said tubular body for insertion into an opening in said electrical box, said first end having an outwardly extending abutment rib circumscribing at least a portion of the exterior periphery thereof and spaced from said distal edge, and an oppositely disposed pair of means for releasably locking said first end within said opening, said locking means each further comprising a locking tab, a notch for receiving the edge of said opening of said electrical box, and an actuator tab adjacent said notch and opposite said locking tab to provide for release of the first end from said opening as desired;

a second end adjacent said proximal edge and having a pair of oppositely disposed adjustable clamping members which operate independently of said locking means and are adapted to substantially immovably clamp said cable within said connector, said clamping members each comprising a wedge-shaped lever which can extend into said connector; and an axially adjustable collar for providing inward clamping rotation to said levers, whereby axial movement of said collar adjusts the clamping force imposed by said levers on cable within said connector.

20. The connector of claim 19, wherein said first and second ends are integrally formed as a unitary structure.

* * * * *